P. Higdon,
Elevator.

N° 51,719.      Patented Dec. 26, 1865.

Witnesses      Inventor
Alex. A. C. Hancock      Philip Higdon
W. F. Hall.

UNITED STATES PATENT OFFICE.

PHILIP HIGDON, OF CROPPER'S DEPOT, KENTUCKY.

IMPROVED HOISTING-MACHINE.

Specification forming part of Letters Patent No. 51,719, dated December 26, 1865.

*To all whom it may concern:*

Be it known that I, PHILIP HIGDON, of Cropper's Depot, in the county of Shelby and State of Kentucky, have made new and useful Improvements in Hoisting-Machines; and I do hereby declare the following to be a full, clear, and exact description of the nature, construction, and operation of the same, sufficient to enable one skilled in the art to which it appertains to construct and use the same, reference being had to the accompanying drawings, which are made part of this specification, in which—

Figure 1:
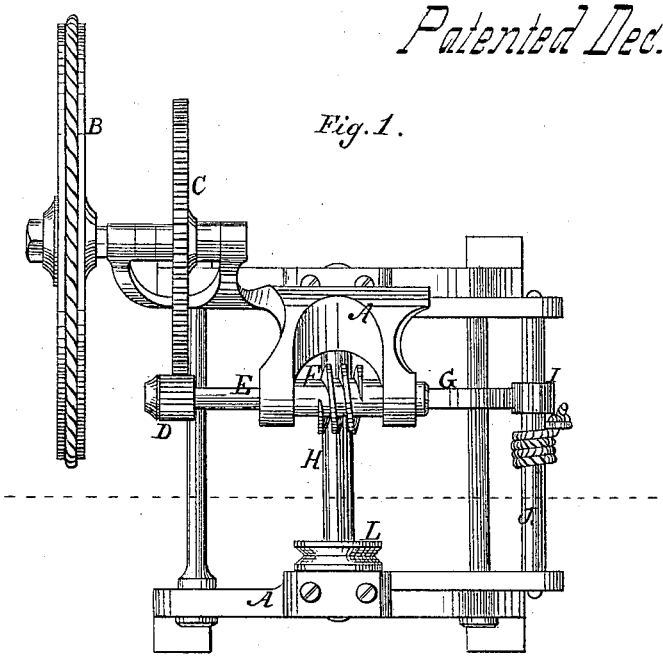
Figure 2:
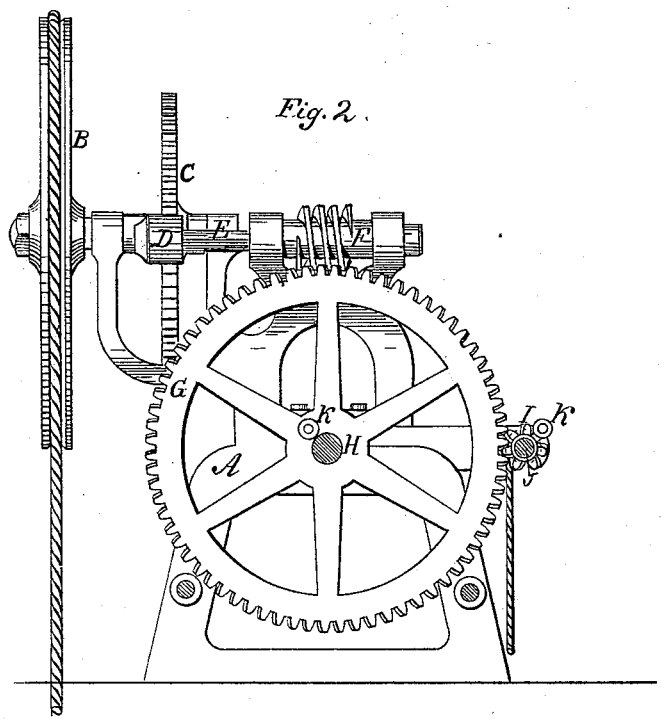

Figure 1 is a plan or top view, and Fig. 2 is a side elevation.

My invention consists of an arrangement of parts in a hoisting-machine by which a brake or pawl is dispensed with and facility given for the raising of bodies more or less rapidly, according to their respective weight.

A A are the various parts of the frame of the machine in which the shafts are journaled.

The power is applied to the wheel B by means of a rope which runs over it, or by a hand-crank, if desired. On the same shaft with the wheel B is the geared wheel C, which engages the pinion D on the shaft E. The latter has a double worm thread or screw, F, which engages with the cog-wheel G on the shaft H, and the latter with the pinion I on the shaft J, around which it wound the rope by which the merchandise to be lifted is suspended. The latter rope is attached to an eye, K.

The wheel I may be driven by a cog-wheel on the shaft H separate from the wheel G, and the said supplementary wheel may be of larger or smaller size, according to the speed with which the wheel I on the shaft J is desired to be driven.

On the shaft H is a drum, L, on which may be wound a rope whose attached weight, being lifted by the ineffective or downward motion of the hoisting-rope, may by falling assist in the effective motion.

The gearing from the wheel B to C produces greater speed of the latter, which is afterward reduced by the relation of the worm F to the cog-wheel G, and eventually partially restored by the relation of the large cog-wheel G to the pinion I. It is not claimed that any greater mechanical effect is produced by the combination of gearing than is due to the power applied, minus the friction; but by the mode of transmission the necessity for a brake or sustaining device is avoided, as the weight upon the shaft will not, though acting powerfully upon the wheel G, suffice to turn the worm against which the cogs of the wheel G impinge in a direction only varying from the perpendicular by the angle of the pitch of the screw. The double-threaded worm-wheel F acts upon two cogs of the wheel G, and in case of any fault in a cog or in one thread of the worm-wheel the weight is sustained by the uninjured portions of the machinery. The pitch of the worm-wheel is double that of the cog wheel G, and one revolution of the former moves the latter two cogs.

Having described my invention, what I claim therein as new, and desire to secure by Letters Patent, is—

The arrangement of the double-threaded worm-wheel F, the shafts H J, and pulley L, substantially as described and represented.

PHILIP HIGDON.

Witnesses:
W. J. STEPHENS,
J. N. COLLINS.